United States Patent

Rehwinkel et al.

[11] Patent Number: 5,134,841
[45] Date of Patent: Aug. 4, 1992

[54] COMBINED GAS/STEAM TURBINE PROCESS

[75] Inventors: Heiko Rehwinkel, Bottrop; Horst Möllenhoff, Mülheim/Ruhr; Hans-Joachim Meier, Alpen-Menzelen, all of Fed. Rep. of Germany

[73] Assignee: Deutsche Babcock Werke Aktiengesellschaft, Oberhausen, Fed. Rep. of Germany

[21] Appl. No.: 846,764

[22] Filed: Mar. 5, 1992

Related U.S. Application Data

[63] Continuation of Ser. No. 557,989, Jul. 25, 1990, abandoned.

[30] Foreign Application Priority Data

Jul. 26, 1989 [DE] Fed. Rep. of Germany ....... 3924615

[51] Int. Cl.$^5$ .................................................. F02C 3/28
[52] U.S. Cl. ........................................ 60/39.02; 60/39.12
[58] Field of Search ............... 60/39.02, 39.12, 39.182, 60/39.464, 39.07; 110/229, 263

[56] References Cited

U.S. PATENT DOCUMENTS

| | | | |
|---|---|---|---|
| 4,253,409 | 3/1981 | Wormser | 110/263 |
| 4,444,007 | 4/1984 | Mitchell | 60/39.12 |
| 4,470,255 | 9/1984 | Rowlands et al. | 60/39.12 |
| 4,802,445 | 2/1989 | Robertson | 60/39.12 |
| 4,896,497 | 1/1990 | Pillai | 60/39.12 |

Primary Examiner—Louis J. Casaregola
Attorney, Agent, or Firm—Max Fogiel

[57] ABSTRACT

A combination gas-turbine and steam-turbine process and a power plant that utilizes the process. A waste-heat recovery system with a steam-circulation system is downstream and a pressurized furnace with a combustion chamber is upstream of a gas turbine. Flue surfaces that heat air are accommodated in the furnace. A pressurized gasifier parallels the furnace. Flue gas from the furnace, preheated combustion air, and combustion gas from the gasifier are forwarded to the combustion chamber. The heat of combustion liberated in the furnace by heating the flue gas to beyond its combustion temperature is transmitted exclusively to the combustion air being forwarded to the combustion chamber.

14 Claims, 2 Drawing Sheets

COMBINED GAS/STEAM TURBINE PROCESS

The present application is a continuation of the parent application Ser. No. 557,989, filed Jul. 25, 1990, abandoned.

BACKGROUND OF THE INVENTION

The flue gas generated in the pressurized furnace, which is in the form of a fluidized furnace, of a known combination gas-turbine and steam-turbine plant (German OS 3 204 672) enters the gas-turbine combustion chamber at the temperature of the turbulent bed. Inside the combustion chamber the temperature of the gas is elevated by burning the combustion gas generated in the gasification reactor. The combustion air entering the gasification reactor and gas turbine is preheated in flue surfaces accommodated in the furnace's fluidized bed. Additional flue surfaces in the fluidized bed and gasification reactor communicate with a steam-circulation system. Some of the released heat is accordingly forwarded to the steam-turbine component of the process, which is less efficient than the overall combination of gas turbine and downstream steam turbine.

In a strictly gas-turbine and steam-turbine combination process, the total heat of the fuel is liberated in the gas-turbine combustion chamber. Enough extra air is supplied to ensure the permissible gas-turbine intake temperature. Only the waste heat downstream of the gas turbine is transmitted to the steam system in a waste-heat boiler. The gas turbine is accordingly responsible for 50% or more of the block's total output. It has been possible to attain the currently employed gas-turbine gas-intake temperatures of over 1100° C. only with natural-gas and oil furnaces.

Also known are combination gas-turbine and steam-turbine plants with fluidized furnaces that have only air-cooled suspended flue surfaces for the heat of combustion to be transmitted to (VBG Kraftwerkstechnik 59 [1979], 634–40 and VDI Berichte 715 [1989], 183–84). The flue gas and heated air is supplied to the gas turbine at a temperature slightly above the combustion temperature of approximately 850° C. This air-cooled circulation system is considered less economical than a steam-circulation system due to the limitation on the gas temperature upstream of the gas turbine.

SUMMARY OF THE INVENTION

The object of the present invention is accordingly to provide a combination gas-turbine and steam-turbine process that employs coal as a fuel and that forwards as much of the liberated heat of combustion as possible to the gas-turbine process.

This object is attained in a generic combination gas-turbine and steam-turbine process in accordance with the invention by the characteristics recited in the body of claim 1. Claim 1 recites a power plant that utilizes the process. Advantageous embodiments of the invention are recited in the subsidiary claims.

Since using coal as the fuel allows a high gas-turbine intake temperature to be established and since the heat of combustion upstream of the gas turbine is transmitted to the flue gas and the air, the heat of combustion is of advantage to the gas-turbine process. The steam-circulation system is used only for the waste-heat system downstream of the gas turbine and for the technologically requisite cooling of such aggregates and structures as the framework and walls of the pressurized furnace and pressurized gasifier. The gas turbine's participation in the total output of the powerplant block is accordingly increased at the expense of the steam process, increasing the overall thermal efficiency.

BRIEF DESCRIPTION OF THE DRAWINGS

Two embodiments of the invention will now be described by way of example with reference to the drawing, wherein.

DESCRIPTION OF THE PREFERRED EMBODIMENT

Figure 1:
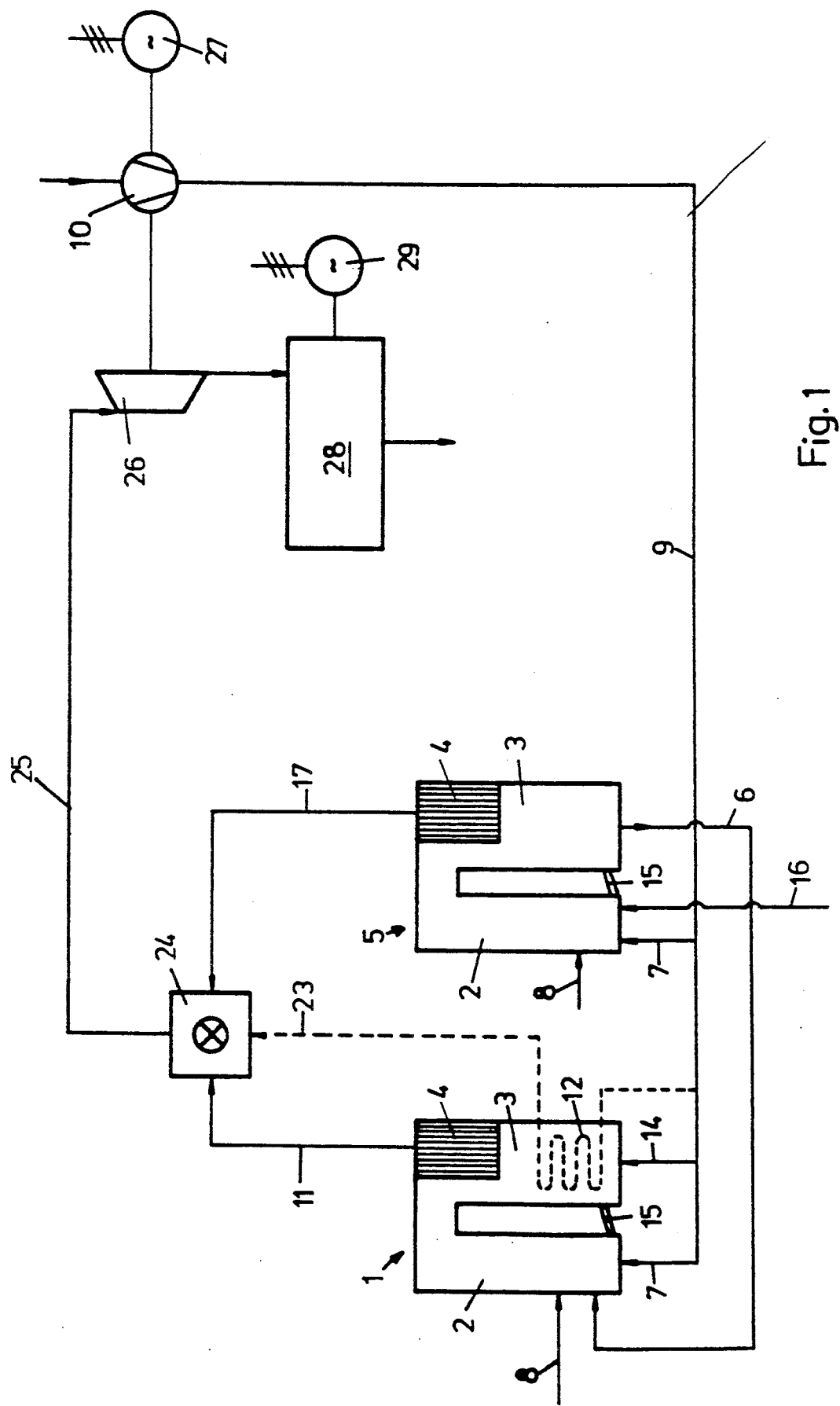
FIGS. 1 and 2 are block diagrams of a combination gas-turbine and steam-turbine process.

The combination gas-turbine and steam-turbine plant comprises a pressurized furnace in the form of a particulate-combustion furnace with solid-matter reintroduction or preferably a pressurized fluidized furnace. Furnace 1 has walls made out of piping welded gas-tight and with water or steam flowing through it. The furnace can also be demarcated by inwardly insulated, ceramic-clad walls. It has two flues 2 and 3, with a reaction section that accommodates the fluidized bed in first flue 2 and is followed by an afterburning section, a precipitator 4, and a section for cooling the precipitated solid matter, which accumulates in a layer in second flue 3.

Paralleling furnace 1 is a pressurized gasifier 5. Furnace 1 and gasifier 5 are preferably constructed of similar components, and the latter also accordingly has a first flue 2 with a fluidized bed, a filtering precipitator 4, and a second flue 3, into which the solids-end outlet from precipitator 4 opens and wherein the separated solid gasification residue (coke) is collected.

The second flue 3 in gasifier 5 communicates with a coke line 6 that communicates in turn with the first flue 2 in furnace 1 and opens into its reaction section. Combustion air is forwarded to the reaction section through an air-injection line 7 and, if desirable, fresh fuel through a fuel-injection line 8. The fuel is a solid fossil fuel, such as wet or dry hard or brown coal and is introduced mechanically, pneumatically, or suspended in a fluid.

Air-injection line 7 is supplied with air by a compressor 10 through an air line 9. The furnace's prescribed air coefficient is 1.3. The flue gases leave the afterburning section and enter precipitator 4 at a temperature of 800° to 1000° C.

Precipitator 4 is a hot-gas filter and can accommodate ceramic filter tubes. The gas-end outlet from precipitator 4 communicates with a flue-gas line 11, and the solids-end outlet opens into second flue 3, where it creates a layer of solid matter.

Figure 2:
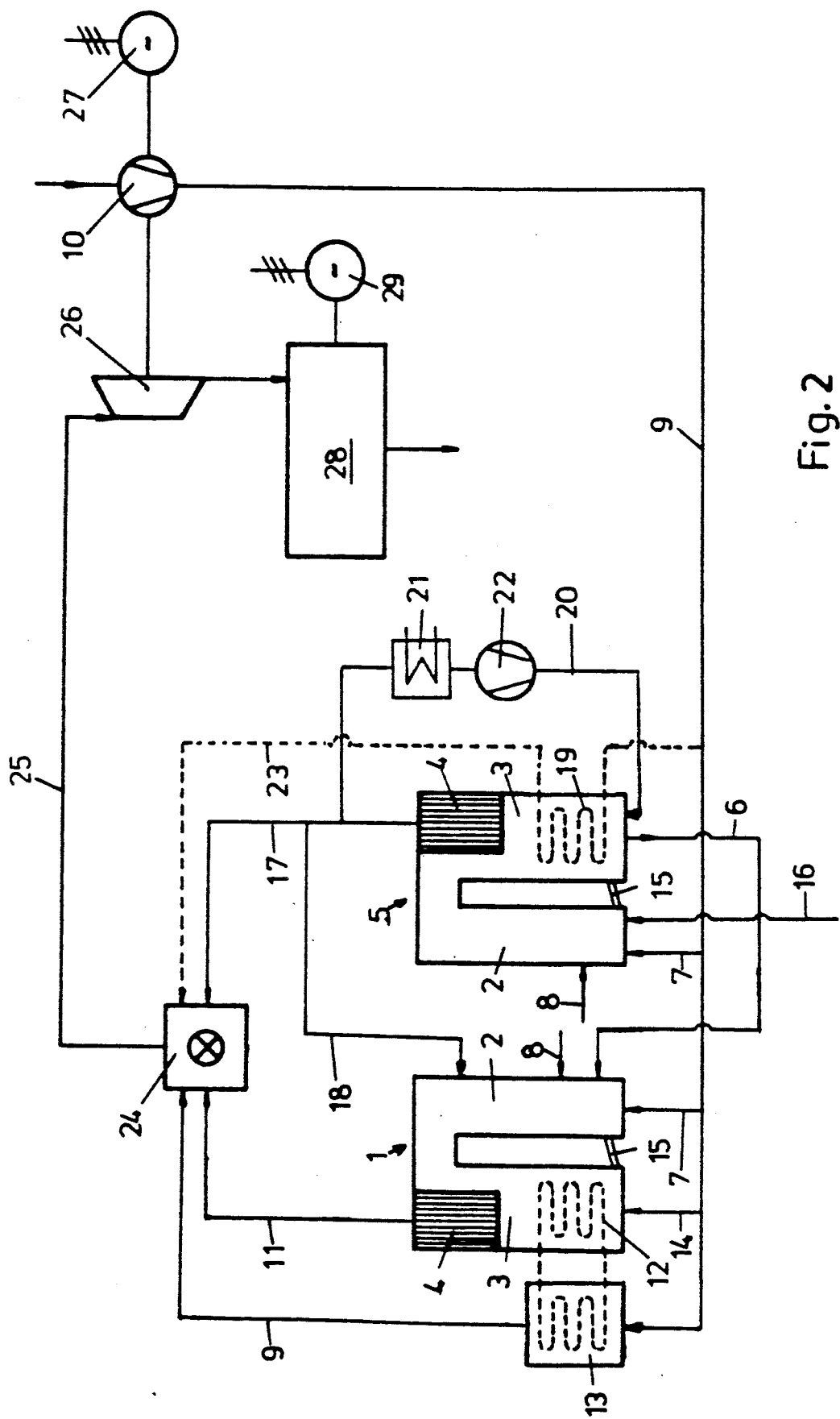

Buried in the layer of solid matter in second flue 3 are flue surfaces 12. Air from air line 9 flows, as will be evident from FIG. 2 through flue surfaces 12. As will be evident from FIG. 2, a gaseous or liquid heat carrier can also flow through flue surfaces 12 and release its heat indirectly into the atmosphere from air line 9 by way of a separate heat exchanger 13. The exchange of heat with the solids heats the current of air to as high as 850° C.

Second flue 3 communicates with air line 9 through another line 14 that injects air into and through the layer of solid matter. The air that flows through this layer is freed of entrained solids in precipitator 4 and exhausted along with the flue gas through flue-gas line 11. The solid matter cools by exchanging heat with the air and is reintroduced into the fluidized bed in first flue 2 through a line 15.

Solid or liquid fuel is degassed or partly gasified under pressure in gasifier 5. The fuel can for example be hard coal or undried brown coal, possibly with water added to it to produce a viscous suspension, introduced through fuelinjection line 8. If the raw material is originally wet enough, it can be injected without additional water.

To ensure a low level of sulfur oxides in the flue gas and fuel gas, it is of advantage to introduce a sulfur-attaching additive, lime or limestone for example, into furnace 1 or gasifier 5 along with the fuel. The sulfides and sulfites that form in gasifier 5 due to reaction of the additive with the sulfur arrive with the coke in furnace 1, where they oxidize into sulfates.

Gasifier 5 is also supplied with compressed air by way of air-injection line 7 and with a gasification agent, water or steam for example, by way of a gasifying-agent injection line 16. The fuel gas obtained by degassing or partial gasification leaves filter and precipitator 4 and is extracted at approximately 850° C. by way of a fuel-gas line 17. To impede the formation of nitrogen oxide in furnace 1 it can be of advantage to pump some of the fuel gas with its carbon oxides out of fuel-gas line 17 and into the first flue 2 in furnace 1 by way of a line 18.

The coke that collects in the second flue 3 in gasifier 5 can be reintroduced into first flue 2 by way of solids-reintroduction line 15 or supplied to furnace 1 by way of coke line 6. To facilitate conveying the coke through line 6, the coke can be cooled in the second flue 3 in gasifier 5. The flue accommodates for this purpose flue surfaces 19 that, like the flue surfaces 12 in furnace 1, communicate with air line 9 and have air flowing through them. A recirculation line 20 can also branch off from fuel-gas line 17 and extend through the base of the second flue 3 in gasifier 5. The recirculation line 20 accommodates a cooler 21 and a recirculating fan 22. The coke is accordingly cooled either indirectly by air and/or directly by the cooled and reintroduced fuel gas.

The flue-gas line 11 from furnace 1, the fuel-gas line 17 from gasifier 5, and either a hot-air line 23, which conveys the indirectly heated air, or air line 9, which leads into and out of heat exchanger 13, extend to a mixing and combustion chamber 24. The currents of hot gas are combined in chamber 24, and the temperature of the mixture is elevated by the combustion. The mixture is forwarded by way of a gas line 25 to a gas turbine 26, where it is depressurized. Gas turbine 26 drives a compressor 10 and a generator 27. The volume of air forwarded to furnace 1 is adjusted in relation to the volume of indirectly heated air to maintain the air coefficient of the flue gas in the total system downstream of gas turbine 26 greater than 1.5.

To control the output of gas turbine 26 the ratio of the fuel supplied to furnace 1 to the fuel supplied to gasifier 5 can be varied. When the load is low, the level of fuel supplied to gasifier 5 is decreased in favor of the fuel supplied to furnace 1. When gas turbine 26 is operated at less than full capacity and at decreased intake temperatures, either furnace 1 or gasifier 5 can be turned off. In this event the overall system is operated with one of the aforesaid aggregates alone. The coke that occurs when gasifier 5 is operated alone must be temporarily stored when necessary.

A gas-end waste-heat recovery system 28 downstream of gas turbine 26 has a steam turbine that powers a generator 29. The turbine's exhaust gases can, finally, themselves be exploited to preliminarily dry the fuel forwarded to the furnace.

We claim:

1. A combination gas-turbine and steam-turbine process, comprising the steps of: providing a gas turbine with a waste-heat recovery system having a steam-circulation system downstream of said gas turbine; providing a combination chamber and a pressurized furnace having a first flue and a second flue upstream of said gas turbine; heating air by flue surfaces in said furnace; transporting to said combustion chamber flue gas from said first flue in said furnace, preheated combustion air, and combustion gas from a pressurized gasifier connected in parallel with said furnace; transmitting heat of combustion liberated in said furnace to said combustion air being transported to said combustion chamber and to flue gas generated by combustion in said furnace; cleaning said flue gas generated in said furnace by separating solids from said flue gas in a first filtering separator; collecting the separated solids in said second flue in said furnace; heating said combustion air by a heat exchange with said separated solids; burning partially fuel in said gasifier for producing reaction heat required for gasification in said gasifier and for producing fuel gas; and transmitting said fuel gas generated in said gasifier at combustion temperature to said combustion chamber, said fuel gas from said gasifier being cleaned by separation from solids in a second filtering separator.

2. A combination gas-turbine and steam-turbine process as defined in claim 1, wherein said preheated combustion air is heated by indirect heat exchange with said solids.

3. A combination gas-turbine and steam-turbine process as defined in claim 1, wherein said preheated combustion air is heated by heat exchange with said solids and with a heat carrier.

4. A combination gas-turbine and steam-turbine process as defined in claim 1, wherein said preheated combustion air is injected through said solids and exhausted along with said flue gas through said first separator.

5. A combination gas-turbine and steam-turbine process as defined in claim 1, wherein output of said gas turbine is controlled by varying the ratio of fuel supplied to said gasifier to fuel supplied to said furnace.

6. A combination gas-turbine and steam-turbine process as defined in claim 1, wherein said furnace is turned off when said gas turbine operates at less than full capacity.

7. A combination gas-turbine and steam-turbine process as defined in claim 1, wherein said gasifier is turned off when said gas turbine operates at less than full capacity.

8. A combination gas-turbine and steam-turbine process as defined in claim 1, including the step of reintroducing fuel gas from said gasifier into said furnace for reducing nitrogen oxide forming therein.

9. A combination gas-turbine and steam-turbine process as defined in claim 1, including the step of introducing brown coal wet from a pit into said gasifier.

10. A combination gas-turbine and steam-turbine process as defined in claim 9, including the step of adding water to said brown coal introduced into said gasifier.

11. A combination gas-turbine and steam-turbine process as defined in claim 1, including the step of introducing a sulfur-attaching additive into said furnace and said gasifier.

12. A combination gas-turbine and steam-turbine process as defined in claim 10, wherein sulfur compounds produced in said gasifier are introduced into said furnace and oxidized in said furnace.

13. A combination gas-turbine and steam-turbine process as defined in claim 1, including the step of drying said fuel forwarded to said furnace by exhaust from said gas turbine.

14. A combination gas-turbine and steam-turbine process, comprising the steps: providing a gas turbine with a waste-heat recovery system having a steam-circulation system downstream of said gas turbine; providing a combustion chamber and a pressurized furnace having a first flue and a second flue upstream of said gas turbine; heating air by flue surfaces in said furnace; transporting to said combustion chamber flue gas from said first flue in said furnace, preheated combustion air, and combustion gas from a pressurized gasifier connected in parallel with said furnace; transmitting heat of combustion liberated in said furnace to said preheated combustion air being transported to said combustion chamber and to the flue gas generated by combustion in said furnace; cleaning said flue gas generated in said furnace by separating solids from said flue gas in a first filtering separator; collecting the separated solids in said second flue in said furnace; heating said preheated combustion air by a heat exchange with said separated solids; burning partially fuel in said gasifier for producing reaction heat required for gasification in said gasifier and for producing fuel gas; transmitting said fuel gas generated in said gasifier at combustion temperature to said combustion chamber, said fuel gas from said gasifier being cleaned by separation from solids in a second filtering separator; heating said preheated combustion air by indirect heat exchange with said solids; said preheated combustion air being injected through said solids and exhausted along with said flue gas through said first separator; controlling output of said gas turbine by varying the ratio of fuel supplied to said gasifier to fuel supplied to said furnace; turning off said furnace when said gas turbine operates at less than full capacity; reintroducing fuel gas from said gasifier into said furnace for reducing nitrogen oxide formed therein; introducing brown coal wet from a pit into said gasifier; drying said fuel forwarded to said furnace by exhaust from said gas turbine; introducing a sulfur-attaching additive into said furnace and said gasifier; introducing sulfur compounds produced in said gasifier into said furnace, said sulfur compounds being oxidized in said furnace.

* * * * *